United States Patent [19]

Jung

[11] Patent Number: 4,713,204

[45] Date of Patent: Dec. 15, 1987

[54] PROCESS OF MANUFACTURING A ONE-PIECE MOLDING FROM A DRY CERAMIC MASS

[75] Inventor: Rolf Jung, Trier, Fed. Rep. of Germany

[73] Assignee: Laeis-Werke AG, Trier, Fed. Rep. of Germany

[21] Appl. No.: 798,167

[22] Filed: Nov. 14, 1985

Related U.S. Application Data

[63] Continuation-in-part of Ser. No. 542,772, Oct. 17, 1983, abandoned.

[30] Foreign Application Priority Data

Oct. 16, 1982 [DE] Fed. Rep. of Germany ....... 3238389

[51] Int. Cl.[4] .............................................. B29C 43/04

[52] U.S. Cl. ...................................... 264/120; 249/58; 264/56; 264/109

[58] Field of Search ......................... 264/56, 109, 120; 249/58

[56] References Cited

U.S. PATENT DOCUMENTS

| | | | |
|---|---|---|---|
| 1,885,303 | 11/1932 | Slick | 249/58 |
| 3,357,056 | 12/1967 | Reyburn | 249/58 |

*Primary Examiner*—James Derrington

[57] ABSTRACT

A process for fabricating one-piece moldings from a dry ceramic mass, in particular crockery or china such as cups, pots, cans and the like having deep handles, grips, lugs or the like as well as a molding arrangement for carrying out this process. The molding arrangement includes a divided mold matrix and a divided punch which define between them a mold cavity into which a sprayed granular dry ceramic mass is fed. By the application of isostatic pressure via the punch the ceramic mass is molded. The molding is then removed by separating the halves of the punch and mold matrix and the molding is then subjected to a kilning step.

5 Claims, 2 Drawing Figures

PROCESS OF MANUFACTURING A ONE-PIECE MOLDING FROM A DRY CERAMIC MASS

This application is a continuation-in-part of application Ser. No. 542,772, filed Oct. 17, 1983, now abandoned.

BACKGROUND OF THE INVENTION

The invention relates to a manufacturing process and arrangement for fabricating moldings of china wear or crockery, in particular cups or pots having deep handles. Such pots or cups are manufactured conventionally in such a way that the main body of the cup or pot, on the one hand, and the handle, grip or lug, on the other hand, are separately molded out of a plastic clay material in gypsum-type molds. Thereafter the handle, lug or grip is, after being subjected to a cleaning process, manually affixed to the main body of the cup or pot. It is also conventional to cast pots or cans out of a thin clay mass.

In addition to the time-consuming and therefore costly manual step of affixing the handle, grip or lug to the main body of the molded article, these known manufacturing processes are also very energy consuming, in view of the fact that the gypsum molds must be dried. Also the amount of rejects and spoilage must be considered in this conventional process which is unavoidable when manual labor is employed and also in view of the pronounced shrinkage that occurs in view of the high water content of the raw material.

SUMMARY OF THE INVENTION

It is the object of this invention to provide a new process and an arrangement for carrying out the fabrication of pots, cans, cups and the like having deep handles, in which process the aforedescribed drawbacks are avoided or mitigated. The process makes it possible to mass produce in an inexpensive way high quality one-piece moldings of crockery and the like on which no further parts such as handles, grips or lugs need to be affixed.

BRIEF DESCRIPTION OF THE DRAWING

With these and other objects in view, which will become apparent in the following detailed description, the present invention, which is shown by example only, will be clearly understood in connection with the accompanying drawing, in which.

DETAILED DESCRIPTION

Figure 1:
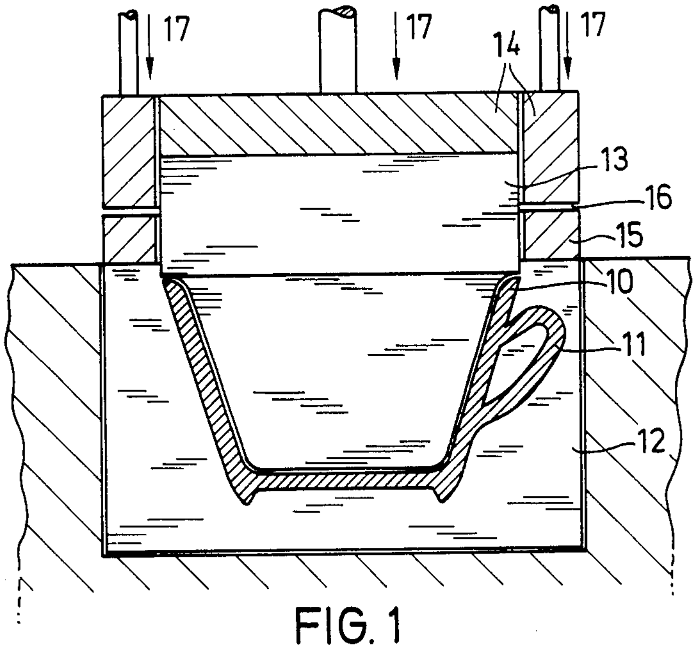
FIG. 1 is a schematic elevational view, partially in cross-section, showing a first embodiment of the arrangement for carrying out the process of this invention.
Figure 2:
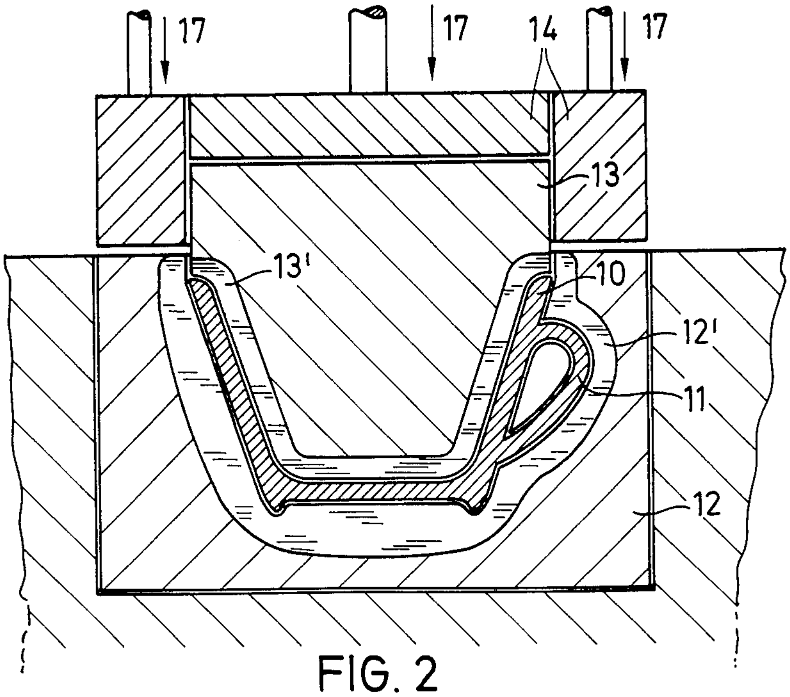
FIG. 2 is a cross-sectional elevational view of a second embodiment of the arrangement for carrying out the process of this invention.

FIG. 1 is a schematic view of a first embodiment for carrying out the process of this invention. All those details which are not necessary for understanding the invention have been omitted for sake of clarity such as, for example, the mechanism for feeding the ceramic mass into the mold half.

The arrangement includes a mold 12 and punch 13 which define between them the shape of the molding. Crockery having a handle are molded by means of a mold 12, which mold is divided, whereby the dividing surface is parallel to the plane of the drawing and is disposed along a diameter of the molding in such a way that the handle 11 or grip, lug or the like, of the cup illustrated in FIG. 1, has an imaginary dividing plane which bisects such handle, lug or the like, which dividing plane is disposed in the plane dividing the two parts of the mold 12. This dividing into two parts of the mold 12 is required for the purpose of permitting the removal of the molding from said mold after the termination of the molding process. The mold 12 and punch 13 are made out of a synthetic material having a Shore-hardness of 80° to 98° A. The exterior contours of the matrix 12 and punch 13, which determine and shape the edge surfaces of the molding, may either have the same hardness or may have mutually different hardnesses. By selecting the most suitable hardness value, it is possible to influence the surface of the molding in such a way that, for example, a subsequent application of a glazing layer adheres particularly well to the molded article. Castable polyurethane resin, having a plural component basis, has been found to be a particularly suitable synthetic material. When the arrangement is in an inoperative condition there is defined between the mold matrix 12 and the punch 13 a hollow space, which is substantially in the form of the molded article, for example, a cup (FIG. 1). In this hollow space there is fed a ceramic mass by means of feeding channels (not further illustrated in the drawing). This ceramic mass consists preferably of a sprayed granular material having a very low remanent moisture. The filling of the mold cavity can be facilitated by employing a pressurized medium and/or vacuum. Also in order to improve the filling of the mold cavity, the mold can be rotated about a vertical axis. The centrifugal forces that are engendered by such rotation aid in transporting the ceramic mass into the outer regions of the mold cavity, including the region defining the handle, grip, lug or the like. After the filling process has been terminated the mold matrix 12 and punch 13, that is the synthetic parts of the mold, are moved via a piston 14 which applies the molding pressure in the direction of the arrow 17, whereby the piston 14 abuts with its central portion against the punch 13, which consists of a synthetic material, and with its edge portion against a ring 15, which seals off the molding matrix 12, consists of synthetic material from above. The molding matrix 12 may be subjected to pressure application in a predetermined time sequence, respectively, it may have a step-up configuration so that the pressure is stepwise applied as a result of this configuration. For example, a gap 16 between the ring 15 and the edge portion of the piston 14 can be so selected that the pressure application is applied first to the punch 13 and only thereafter also onto to the mold matrix 12. The time sequence and the level at which the corresponding pressure application are carried out are determined by the type of ceramic material to be processed and the special form of the moldings to be manufactured. Since in determining these factors, numerous parameters come into play which are only partly controllable, the most favorable values are best determined empirically and experimentally. Thus said mold matrix and punch coact in such a way during the molding process that over a predetermined period of molding time different pressures are applied and/or released via the punch to the molding.

The molding process is based on the recognition that the synthetic material of the mold is substantially incompressible, and, therefore, when pressure is applied in a substantially uniform manner onto to the ceramic mass which fills the hollow spaces of the mold, the pressure is applied to the ceramic mass uniformly, so as to form a one-piece, easily handleable and manipulable molding.

After terminating the molding process as a result of the upward movement of the piston 14 in a direction opposite to the arrow 17, the molding can be pressure-released. As has been carried out with the pressure application, the pressure-release can also be carried out in a predetermined time sequence. This is achieved by means of a special configuration of the piston 14 and its coaction with the molding matrix 12 and, respectively, with the punch 13.

In a further embodiment of the invention the molding matrix 12 and the punch 13 are primarily made out of metal, preferably steel, and only those portions of the afore-mentioned parts which contact the ceramic mass, to wit the border regions 12' and 13' are made out of synthetic material. Since the synthetic material is applied in a relatively thin layer, the adjustments to the desired degree of hardness can be better controlled. The useful life of the various parts of the mold is also increased. Good molding result could already be obtained with molding pressures of 200 to 500 $kg/cm^2$ when using a multi-component polyurethane resin mold with a breaking point elongation up to 300%.

To the best knowledge of the inventors, the process herein described is the first one to achieve a one-piece molding from a relatively dry ceramic starting material in which such molding has a deep form and has a unitary handle (i.e., grip or lug), which molding in the subsequent kilning process can be further worked with excellent results. The reduced moisture content of the basic raw material mass leads to a reduced shrinkage so that the waste is drastically reduced.

The process of the invention dispenses with costly manual steps required for affixing the handle and/or grip, and/or lug etc. and leads to an aesthetically very pleasing shape, since aesthetically pleasing handles with grip shapes can be realized.

It is, of course, possible to manufacture with the process of the invention also simpler configurations, for example, cups or pitchers without handles and/or grips and also pipes. In such cases, the molding matrix 12 does not necessarily need to be divided for purposes of removing the molding.

Although the invention is described and illustrated with reference to a plurality of embodiments thereof, it is to be expressly understood that it is in no way limited to the disclosure of such preferred embodiments but is capable of numerous modifications within the scope of the appended claims.

I claim:

1. A process for fabricating one-piece moldings from a dry ceramic mass, having deep handles, comprising the steps of (a) filling a mold cavity which defines the shape of the molding with a sprayed granular ceramic mass via feed channel means;

(b) said mold cavity being formed by a divided punch and a divided mold matrix, said punch and mold matrix having molding surfaces which contact the ceramic mass during molding; at least said molding surfaces being made of synthetic material, an inner contour of said molding being matingly shaped with respect to said divided punch and an outer contour of said molding being matingly shaped with respect to said mold matrix, said mold matrix and punch defining a mold cavity for handle or grip there between, a dividing plane of said mold bisecting said handle or grip;

(c) applying pressure to said sprayed granular ceramic mass in said mold cavity via said divided punch to mold said ceramic mass in said mold cavity; and (d) said mold matrix and punch coact in such a way during the molding process that over a predetermined period of molding time different pressures are applied via the punch to the molding.

2. The process for fabricating one-piece moldings as set forth in claim 1, wherein said mold matrix and molding step and punch are made of a multi-component urethane resin having Shore-hardness of 80° to 98° A. and having a breaking point elongation up to 300%.

3. The process for fabricating one-piece moldings as set forth in claim 2, wherein said molding matrix and punch have a metal core and layer of synthetic marterial which forms the molding surfaces.

4. The process for fabricating one-piece moldings as set forth in claim 3, wherein said metal cores are made of steel.

5. The process for fabricating one-piece moldings as set forth in claim 1, including the step of rotating said molding about an axis of said punch which axis is also disposed in the plane of symmetry passing through said molding.

* * * * *